Patented May 7, 1929.

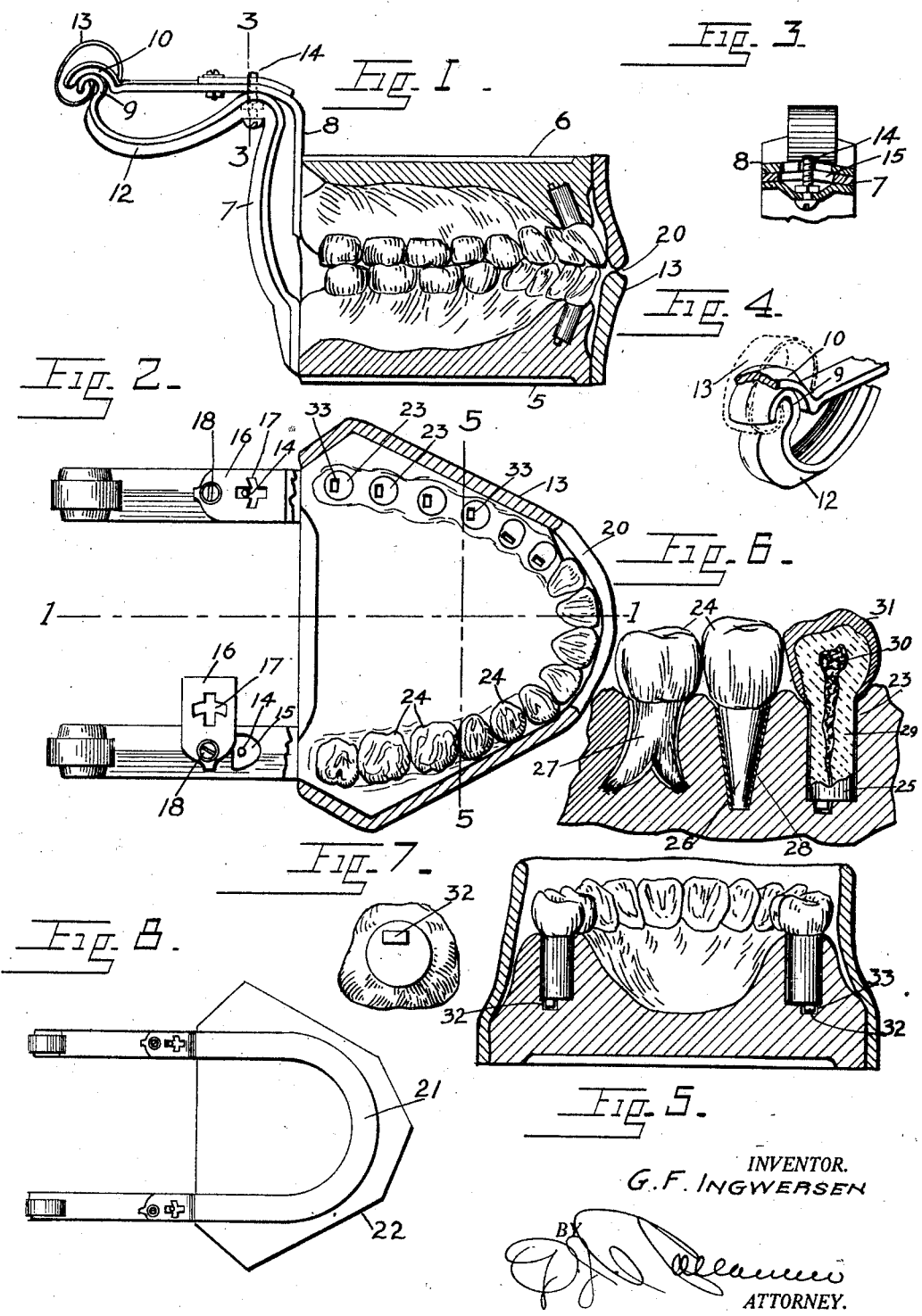

1,711,947

UNITED STATES PATENT OFFICE.

GUSTAV FRED INGWERSEN, OF DENVER, COLORADO.

DENTAL MODEL.

Application filed August 17, 1926. Serial No. 129,780.

This invention relates to models for use in the study of dentistry in its different branches and an object of the invention resides in providing a model of the above stated character in which upper and lower jaw-members made in conformity with the maxilla and the mandible of the human skull are joined for articulation closely resembling the movement of the human lower jaw in mastication.

Another object is to produce the joint between the jaw-members of the model so that they may be readily separated for individual use or inspection, and replaced in their correct relative positions, and a further object is to provide in association with the joint, means to direct the movement of the lower jaw member in given paths to facilitate the use of the model when it is desired to place the teeth of its jaw-members in different positions of occlusion.

Still another object of the invention resides in means associated with the jaw-members to represent the human mouth and a further object may be found in the provision of a model having members conforming with the human jaws, in which the teeth are presented in their natural form and relative arrangement so that they can be operated upon by the student in exactly the same manner as the operations would be performed in actual practise.

The artificial teeth are mounted so as to move under pressure to substantially the same extent and in the same manner as those in the mouth of a living person, and they have a structure accurately resembling that of natural teeth.

With the above and other objects in view as will appear in the course of the following description, my invention consists in the construction and arrangements of parts illustrated in the accompanying drawings in the several views of which like parts have been similarly designated and in which:

Figure 1 represents a sectional elevation of the dental model,

Figure 2, a plan-view of the model, partially broken away to show the arrangement of the teeth in the lower jaw-member, Figure 3, a section taken on the line 3—3 Figure 1, Figure 4, a partially sectional and fragmentary perspective view of one of the joints by which the jaw-members are connected for relative articulation, Figure 5, a transverse section through one of the jaw members taken on the line 5—5 Figure 2, Figure 6, an enlarged sectional view of a portion of one of the jaw-members showing different forms of artificial teeth and the method of mounting the same, Figure 7, an enlarged underneath view of one of the teeth shown in Figure 5, and Figure 6, and Figure 8, a plan view of the model, drawn to a reduced scale and showing a modification in the construction, which adapts the device for use as a dental articulator.

Referring further to the drawings, the model as shown in Figures 1 and 2 comprises an upper member 5 and a lower member 6 connected for articulation in accordance with the jaw-movement on the human skull. Each member consists of a body formed to simulate the gums, and teeth mounted on the body, in form and relative arrangement identical to those in the human mouth.

The members are supported one upon the other, normally in centric occlusion, the body and teeth of the upper member being formed and arranged to simulate the gums and teeth of the maxilla and the body and teeth of the lower member representing the tissues and teeth of the mandible.

The two members are connected at their rear ends to pairs of legs 7 and 8 preferably made in the form of metal straps which extend upwardly and rearwardly to a point of articulation which is positioned relative to the members in accordance with the position of the joints on the temporal bones of the human skull, with relation to the denture. The extremities of the straps on the lower member of the model are formed into rounded heads 9 which represent the condyle of the natural joint and those of the straps on the upper member are bent into sockets 10 to imitate the glenoid fossa of the same, the rounded heads and sockets engaging one another so that their relative movement will be in strict accordance with the movements of the human mandible relative to the maxilla.

The members of the model thus connected, may be separated in correspondence with the up and downward motion of the mandible, they may be relatively displaced to imitate mesual and distal movements in harmony with the inclined planes of the teeth, and they may be moved laterally from centric to concentric occlusion in opposite directions.

With these objects in view the rounded heads 9 on the legs of the lower member of the model have their articular surfaces inclined from a medial line to correspond with the shape of the condyle in the human skull, and the sockets of the legs on the upper member have a curvature of greater radius and are formed to correspond with the shape of the articular surfaces of the knuckles with which they engage.

The legs of the lower member are curved away from those of the upper member, as at 12, to facilitate manipulation, and the members are held in their relative operative position by C-springs 13 which embrace the engaging extremities of the legs.

In order to limit the lateral displacement of the jaw-members to concentric occlusion, the straps of the lower member are provided with screw pins 14 which extend through openings 15 in the corresponding straps of the upper member. These openings are of substantially semi-circular contour as best shown in Figure 2, so that they may guide the pins to follow a path resembling the lateral movements of the lower human jaw in mastication.

It is frequently required in the study of dentistry that the student determine the direction of the inclined planes of the teeth in which case it is desirable that the jaws be moved directly forward or rearward or directly sideways to concentric occlusion, and for the purpose of facilitating these adjustments in the model of the present invention, plates 16 are provided which in their operative position cover the openings 15 in the straps of the upper jaw members and which are provided with cross-shaped slots 17 to guide the pins on the straps of the lower member.

The plates are pivotally mounted by means of screws 18 so that they may be turned aside when not in use, as illustrated in Figure 2.

It will be apparent that by the arrangement as shown and hereinabove described every natural movement of the mandible may be accurately reproduced in the model, which obviously is of great advantage to the student in preparing himself for the performance of operations in actual practise. The two jaw-members are easily disconnected for separate manipulation by removal of the springs 13 and it is to be understood that while in the drawings the members of the model have been shown to represent the complete denture on the mandible and maxilla, the members may be reduced in size to represent only one-half of the jaws, in which case one strap on each member is sufficient to produce the joint between them. This modified form can be readily perceived by imagining the model shown in Figure 2 to be cut along a line 1—1 and it is therefore not deemed necessary to further show the same by additional illustration.

The two members of the model may be connected by a strip 19 of rubber or other elastic material which covers the teeth and is slit at the front of the model, as at 20, to represent the mouth. The resilient covering is attached to the jaw members along its upper and lower edges and it can stretch sufficiently to permit of the members separating to an angle of fifty-five degrees which is the maximum extent to which the human mouth can be opened.

The springs 13 of the joints between the members aid in limiting the movement of the members to the above stated maximum. The presence of the rubber covering gives the student the opportunity to learn the manipulation of instruments in performing operations on the teeth through the mouth.

In the modified form of the invention shown in Figure 8, the straps of the members of the construction illustrated in Figure 1, are connected by a U-shaped cross-member 21 for the attachment of a plate 22 on which the jaw-members may be permanently or detachably fastened. The plates 22 may also be employed to support casts in the production of artificial teeth and it will be observed that the invention thus modified, may be utilized to perform the functions of a dental articulator.

A very important and valuable feature of the model resides in the construction of the teeth and the method of mounting them on the jaw-members, which so closely simulate the structure of the natural teeth and their position in the human mouth as to greatly aid the student in learning to perform operations under conditions corresponding to those found in nature.

The members 5 and 6 which are formed to represent the contour of the human jaws are provided with sockets 23 in an arrangement corresponding with that of the teeth on the jaws. The teeth 24 are formed in imitation of the natural teeth and their roots may be represented by a cylindrical stem 25, a tapering stem 26 or a bifurcated stem 27, as illustrated in Figure 6. The sockets are formed to admit the stems of the teeth in spaced relation to their walls so that when the stems are fastened at the bottoms of their respective sockets, the teeth are capable of a limited lateral flexure. The space between the stems of the teeth and the walls of the sockets may, if so desired, be filled with rubber or other elastic substance as shown at 28, to yieldingly hold the teeth in their normal positions.

Each tooth has a body portion 29 representing the dentine, a core 30 which represents the pulp-cavity, and a covering 31 to represent the enamel of the natural tooth.

In order to facilitate the placement of the teeth in the correct positions when the model is being made, they may be provided at the ends of their roots with eccentric lugs or tenons 32 which fit in correspondingly formed and correspondingly positioned cavities 33 on the bottom-surfaces of the sockets.

The sockets are preferably circular to support the teeth having circular roots or they may be oval in section as shown in Figure 2 in which case the roots of the teeth are similarly shaped, or the sockets may be branched to admit the bifurcated roots of the teeth of the form shown in Figure 6. In each case the roots are spaced from the walls of the respective sockets and they are fastened at their ends to the bottom-surfaces of the sockets by cement or other suitable means.

It is preferred to compose the jaw-members of the model of a celluloid compound that will soften under heat and thus may be pressed in molds to the desired shape. The teeth are in that case fastened in their sockets by welding the contacting surfaces together through the proper application of heat.

The teeth if made to represent the structure of natural teeth as shown in Figure 6, may have their body portion 29, representing the dentine, made of soft porcelain or cement, the outer covering 31, representing the enamel, of baked porcelain or harder cement, and the core 30, representing the cavity, of rubber or other soft material.

In forming the model both the tissues and gums are accurately represented, the teeth are made to accurately conform with the teeth of a natural denture and they are placed in their proper position with their crowns engaging one another. The dental student may operate on any of the teeth as in actual practice and separate them at their contact points by ligatures or other means, for the purpose of applying a matrix or dam in filling cavities, or for cleaning or other operation requiring the temporary separation of the teeth.

It is to be understood that the roots of the artificial teeth have sufficient resiliency to permit of the lateral movement of the teeth by pressure and that the teeth will spring back in place when the pressure is released.

The construction of the teeth has also the advantage that after they have been operated upon by the student, they may be separately removed and replaced by others.

Having thus described my invention, it will be apparent that the model as constructed affords every opportunity to the student of learning the manipulation of instruments and dental appliances under substantially the same conditions as are found in actual practise and that the student can not only separate the jaws to gain access to the teeth but can also obtain the proper occlusion of the teeth in both their centric and concentric positions, it being understood that the formation of the joints between the members of the model in conformity with those of the mandible with the glenoid fossa of the temporal bones permits of moving the lower member in all directions in exact simulation of the movements of the mandible in mastication.

This feature of the invention is also of value when the joint is used in connection with an articulator to secure correct articulation in the production of artificial teeth.

What I claim and desire to secure by Letters Patent is:—

1. An instrument of the character described comprising models of the upper and lower jaws having upwardly ranging legs and at the ends thereof, a rounded head and a socket differing from each other in the radii of the curves of their meeting surfaces and engaging one another for articulation, and means to movably maintain the knuckle and the socket in cooperative relation.

2. An instrument of the character described comprising models of the upper and lower jaws having upwardly ranging legs and at the ends thereof, a rounded head and a socket engaging one another on surfaces of articulation slanting transversely according to those of the glenoid and condyle in the natural joint between the human jaws, and means to movably maintain the knuckle and the socket in cooperative relation.

3. An instrument of the character described comprising models of the upper and lower jaws having upwardly ranging legs and at the ends thereof, a head and a socket having engaging surfaces of articulation which slant oppositely from medial lines, and means to movably maintain the knuckle and the socket in cooperative relation.

4. An instrument of the character described comprising models of the upper and lower jaws having upwardly ranging legs and at the ends thereof, a head and a socket having engaging surfaces of articulation differing from each other in the radii of the curves of their meeting surfaces and slanting oppositely from medial lines, and means to movably maintain the knuckle and the socket in cooperative relation.

5. An instrument of the character described comprising models of the upper and lower jaws jointed for the articular and lateral movement of one relative to another, and means, separate from the joint between the models for guiding one member in its lateral displacements, with relation to the other.

6. An instrument of the character described comprising models of the upper and lower jaws jointed for the articular and lateral movement of one relative to another, and means, separate from the joint between the models for guiding one member for its lateral displacement with relation to the other in an endless path.

7. An instrument of the character described comprising models of the upper and lower jaws jointed for the articular and lateral movement of one relative to another, and means for guiding the movable member for its lateral displacement in two directions crossing one another.

8. An instrument of the character described comprising models of the upper and lower jaws jointed for the articular and lateral movement of one relative to another, and selective means for guiding the movable member in its lateral displacement in either an endless path or in two directions crossing one another.

9. In an instrument of the character described, upper and lower members having upwardly ranging legs jointed at their ends for articulate and lateral movements of one member relative to another, one of the legs having a guiding opening and the other leg having a projection in the opening.

10. In an instrument of the character described, upper and lower members having upwardly ranging legs jointed at their ends for articulate and lateral movements of one member relative to another, one of the legs having a cross-shaped slot and the other leg having a projection in said slot.

11. In an instrument of the character described, upper and lower members having upwardly ranging legs jointed at their ends for articulate and lateral movements of one member relative to another, one of the legs having a guiding opening, an adjustable plate on the leg having a cross-shaped slot adapted to register with the opening, and a projection on the other leg extending in the opening and the slot.

12. In a dental model, a jaw-member having a socket, and a tooth having a flexible root fastened in the socket in spaced relation to the wall thereof.

13. In a dental model, a jaw-member having sockets arranged in conformity with the arrangement of teeth in a natural denture, and contacting teeth having roots fastened in the sockets in spaced relation to the walls thereof.

14. In a dental model, a jaw-member having a socket, and a tooth having a flexible root fastened at its end to the bottom of the socket, the root being spaced from the wall of the socket to permit of its lateral flexure.

15. In a dental model, a jaw-member of celluloid compound, having a socket, and a tooth of celluloid compound having a root the end of which is welded in the bottom of the socket.

16. In a dental model, a jaw-member of a molded substance, having a socket, and a tooth having a root of moldable material, the end of which is welded in the bottom of the socket.

17. In a dental model, a jaw-member having a socket, and a tooth having a root in the socket, the socket and the root having a tenon-and-cavity connection to determine the correct position of the tooth on the jaw-member with reference to a natural denture simulated by the model.

In testimony whereof I have affixed my signature.

GUSTAV FRED INGWERSEN.